United States Patent [19]

Nakazawa et al.

[11] 4,240,134
[45] Dec. 16, 1980

[54] SWITCHING REGULATOR

[75] Inventors: Hiroshi Nakazawa, Kawagoe; Yasuharu Baba, Atsugi, both of Japan

[73] Assignee: Sony Corporation, Tokyo, Japan

[21] Appl. No.: 30,389

[22] Filed: Apr. 16, 1979

[30] Foreign Application Priority Data

Apr. 17, 1978 [JP] Japan ............................. 53/44994

[51] Int. Cl.³ .................................... H02M 3/335
[52] U.S. Cl. ................................. 363/21; 363/28; 363/41; 363/97
[58] Field of Search ............... 363/20, 21, 27, 28, 363/26, 41, 96, 97, 131, 135

[56] References Cited

U.S. PATENT DOCUMENTS 4,121,282 10/1978 Ohsawa ........................... 363/41 X

FOREIGN PATENT DOCUMENTS 2702943 8/1977 Fed. Rep. of Germany ............. 363/20

Primary Examiner—William M. Shoop
Attorney, Agent, or Firm—Hill, Van Santen, Steadman, Chiara & Simpson

[57] ABSTRACT

A switching regulator includes a DC voltage source having a pair of DC output terminals, a switching transformer having a magnetic core, first and second primary windings and a secondary winding, a first switching transistor connected in series between the pair of DC output terminals through the first primary winding, a second switching transistor connected in series between the pair of DC output terminals through the first and second primary windings, and a rectifier circuit connected across the secondary winding. A pulse width modulator is provided to produce a PWM (pulse width modulated) control signal the duty of which is proportional to the voltage of the rectifier circuit, and the PWM control signal is selectively supplied to one of the first and second switching transistors in response to the low or high circumstance of a load connected to the rectifier circuit. Further, a control circuit is provided so as not to excessively drive one of the first and second switching transistors during the switching operation thereof.

10 Claims, 14 Drawing Figures

SWITCHING REGULATOR

BACKGROUND OF THE INVENTION

1. Field of the Invention

The present invention relates generally to a switching regulator and more particularly relates to a switching regulator for use with a wide range of load variations.

2. Description of the Prior Art

In the art there has been propsoed a switching regulator which can supply a stable DC voltage without the efficiency lowered and regardless of large variation of a load. As such a switching regulator, Koizumi U.S. Ser. No. 962,654, entitled "Switching Regulator", Filed Nov. 21, 1978, and assigned to the same assignee as the present invention, was proposed, and it will be first described with reference to FIG. 1.

In FIG. 1, reference 1 designates a power supply plug which will be supplied with the commercial AC voltage. The commercial AC voltage fed to the plug 1 is applied through power switches 2 to a rectifier circuit 3 and then rectified and smoothed thereby to be a DC voltage. The DC voltage thus produced is applied through a primary winding 4a of a transformer 4 with a magnetic core and a diode 5 for blocking a reverse current to an NPN-type transistor 6, which forms a first switching element, and the DC voltage appearing at the mid tap of the primary winding 4a is fed to an NPN-type transistor 7 which forms a second switching element. In this case, it is assumed that the inductance of the winding portion between one end and the mid tape of the primary winding 4a is taken as L1, and the inductance of the winding portion between the mid tap and the other end of the primary winding 4a is taken as L2.

Across a secondary winding 4b of transformer 4, there is produced an AC voltage due to the switching operation of transistor 6 or 7. This AC voltage derived from the secondary winding 4b is fed to a rectifier 8, and then rectified and smoothed as a DC voltage. This DC voltage is delivered to an output terminal 9. The DC voltage at the output terminal 9 is fed to a voltage detecting circuit or detector 10 which detects the value of the applied voltage. The detected output therefrom is applied through an insulating coupler 11 such as a photo-coupler or the like to a pulse width modulator 12, which will generate a switching signal, as a modulating input. While the pulse width modulator 12 is also supplied with the clock pulse from a clock pulse oscillator 13 as a carrier. The pulse width of the switching signal, which is the output signal from the pulse width modulator 12, is varied in response to the DC voltage obtained at the output terminal 9 to stabilize the DC voltage as a desired constant value.

In the prior art switching regulator shown in FIG. 1, a resistor 14 with a small resistance value and serving as a current detector is inserted between the secondary winding 4b of transformer 4 and the ground. The voltage drop across the resistor 14 is fed to a current detecting circuit or detector 15. This current detector 15 is so formed that its output side becomes a low level "0" when the voltage drop across the resistor 14, i.e., output current from the output terminal 9 is lower than a predetermined or threshold value I TH, while its output side becomes a high level "1" when the output current is higher than the predetermined value I TH. The detected output from the current detector 15 is fed through an insulating coupler 16 such as a photo-coupler or the like to a control circuit such as a D-type flip-flop circuit 17 at its D-input terminal which is also supplied at its trigger input terminal T with the clock pulse from the clock pulse oscillator 13. The output appearing at a $\overline{Q}$-output terminal of the D-type flip-flop circuit 17 is fed, as a gate signal, to one input terminal of an AND-circuit 18 which is supplied at the other input terminal thereof with the switching signal from the pulse width modulator 12. The switching signal delivered from the AND-circuit 18 is applied to the base of the transistor 6. The output signal appearing at a Q-output terminal of flip-flop circuit 17 is fed, as a gate signal, to one input terminal of an AND-circuit 19 which is supplied at the other input terminal thereof with the switching signal from the pulse width modulator 12. The switching signal delivered from the AND-circuit 19 is applied to the base of the transistor 7.

According to the above prior art switching regulator, when a load connected to the output terminal 9 is small, the output current appearing at the output terminal 9 decreases. However, when the output current is lower than the predetermined or threshold level I TH of current detecting circuit 15, its detecting output becomes "0". Therefore, the output at the Q-output terminal of flip-flop circuit 17 becomes "0" in synchronism with the clock pulse from the clock pulse oscillator 13 and hence the transistor 7 becomes OFF.

At this time, however, since the output at the $\overline{Q}$-output terminal of flip-flop circuit 17 becomes "1", the switching signal from the pulse width modulator 12 passes through the AND-circuit 18 and is fed to the base of transistor 6. Accordingly, the transistor 6 carries out the switching of the input DC voltage and hence an output DC voltage Vo is produced at the output terminal 9. In this case, since an input DC voltage Vi from the rectifier circuit 3 is applied to the whole primary winding 4a of transformer 4 or the series connection of inductances L1 and L2, if it is assumed that the duty ratio of the switching signal is taken as D, its period as Tp and the magnitude of the load as RL, respectively, the output DC voltage Vo is expressed as follows:

$$V_o = V_i \cdot D \sqrt{\frac{RL \cdot R_p}{2(L1 + L2)}}$$

The maximum output power Po is expressed as follows:

$$P_o = \frac{V_o^2}{RL} = \frac{V_i^2 \cdot D^2 \cdot T_p}{2(L1 + L2)} \qquad (1)$$

Accordingly, if the inductance values L1 and L2 are previously selected, the output voltage Vo, which is sufficiently stable regardless of load variations, can be obtained even if the load is small.

When the load connected to the output terminal 9 is great, the output current at the output terminal 9 increases. If the output current exceeds the threshold level I TH of DC current detector 15, its detected output becomes "1". Thus, the output at the $\overline{Q}$-output terminal of flip-flop circuit 17 becomes "0" in synchronism with the clock pulse from the clock pulse oscillator 13, so that the output from the AND-circuit 18 becomes "0" and hence the transistor 6 turns OFF. At this time, however, since the output at the Q-output terminal of flip-flop circuit 17 becomes "1", the switching signal from the pulse width modulator 12 is fed through the AND-circuit 19 to the base of transistor 7 to make the latter operative. Thus, in this case, the winding portion of the primary winding 4a of transformer 4 from its one end to its mid tap, whose inductance value is L1, is actually used. Thus, the maximum output power Po at this time is expressed as follows:

$$P_o = \frac{V_i^2 \cdot D^2 \cdot T_p}{2L1} \quad (2)$$

In this case, since the inductance value is small as compared with the case where the load is small, the maximum output power Po, which can be derived from the output terminal 9, becomes great as will be clear from the equations (1) and (2). That is, even if a great output is derived, the DC voltage at the output terminal 9 is stable, or even if the load is great, the DC voltage, which is sufficiently stable for the load variations, can be obtained. In this case, since the load variation is processed by changing the inductance value to L1+L2 or L1, the efficiency is not lowered. Further, in this case, the transistor 6 or 7 is switched by the switching signal obtained at the output side of the pulse width modulator 12, so that a desired constant DC voltage can be obtained at the output terminal 9.

With the above prior art switching regulator, however, since the current appearing at the secondary side of transformer 4 is detected so as to detect the load variation, the coupler 16 such as a photo-coupler or the like is necessary so as to insulate the primary side of transformer 4 from its secondary side and also the resistor 14 and current detector 15 are necessary for detecting the current. Thus, the prior art switching regulator is complicated in circuit construction and hence expensive.

In the prior art switching regulator of FIG. 1, if the pulse width of the switching signal applied to the transistor 6 is 50% upon the transistor being switched from 6 to 7, the transistor 7 is operated with that pulse width. Thus, the output voltage becomes somewhat overshot and hence the transistor is switched from 7 to 6, so as to decrease the pulse width rapidly. At this time, in turn the output voltage becomes much too low, and hence the pulse width becomes wide. Thus, the transistor is switched again to 7, and a kind of oscillation is caused. As a result, the switching of switching elements can not be carried out smoothly.

OBJECTS AND SUMMARY OF THE INVENTION

Accordingly, an object of the present invention is to provide a switching regulator free from the undesirable features inherent to the prior art.

Another object of the invention is to provide a switching regulator in which switching can be changed over smoothly.

A further object of the invention is to provide a switching regulator in which the slope of the output from a sawtooth wave generator is controlled in association with the changing of switching elements.

In accordance with one example of the present invention, a switching regulator is provided which includes a DC voltage source having first and second DC output terminals, a switching transformer having a magnetic core, first and second primary windings and a secondary winding, a first switching transistor connected in series between the first and second DC output terminals through the first primary winding, a second switching transistor connected in series between the first and second DC output terminals through the first and second primary windings, a rectifying circuit connected across the secondary winding, a load connected to the rectifying circuit, a clock pulse oscillator, a pulse width modulator supplied with both outputs of the clock pulse oscillator and the rectifying circuit so as to produce a PWM control signal, the duty of which is proportional to the voltage of the rectifying circuit, and a switching circuit for selectively supplying the PWM control signal to one of the first and second switching transistors in response to the circumstances of the load, the switching regulator further comprising a control circuit for narrowing the duty of the PWM control signal when the switching circuit is operated to supply the PWM control signal from one of the first and second switching transistors to the other so as to eliminate an excessive drive to the other switching transistor.

The other objects, features and advantages of the present invention will become apparent from the following description taken in conjunction with the attached drawings through which the like references designate the same elements.

DESCRIPTION OF THE PREFERRED EMBODIMENT

Figure 1:
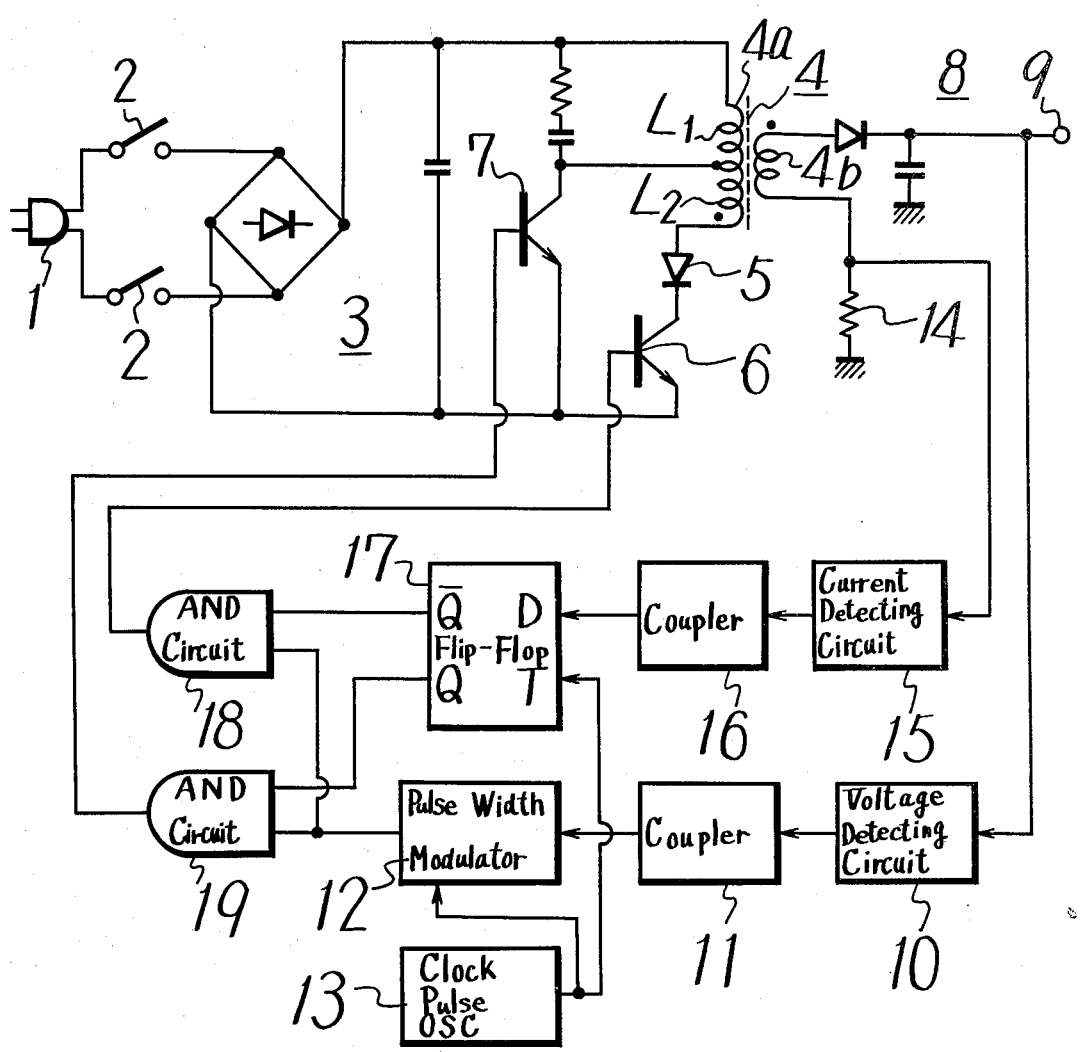
FIG. 1 is a schematic diagram showing an example of the prior art switching regulator.

An example of the switching regulator according to the present invention will be hereinbelow described with reference to FIGS. 2 to 5, in which the elements corresponding to those of FIG. 1 are marked with the same reference characters and their detailed description will be omitted.

Figure 2:
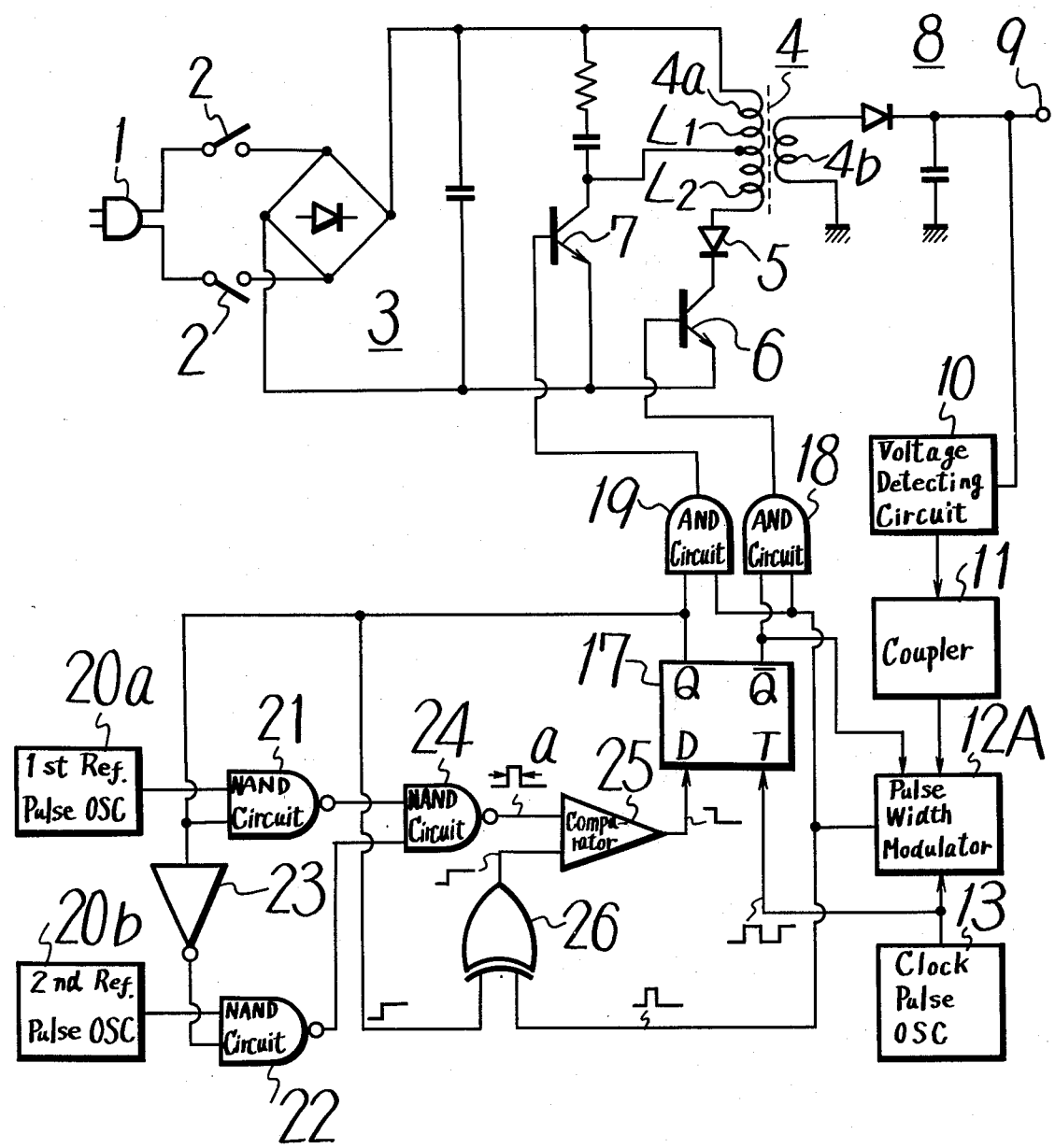
FIG. 2 is a schematic diagram showing an example of the switching regulator according to the present invention.
Figure 3:
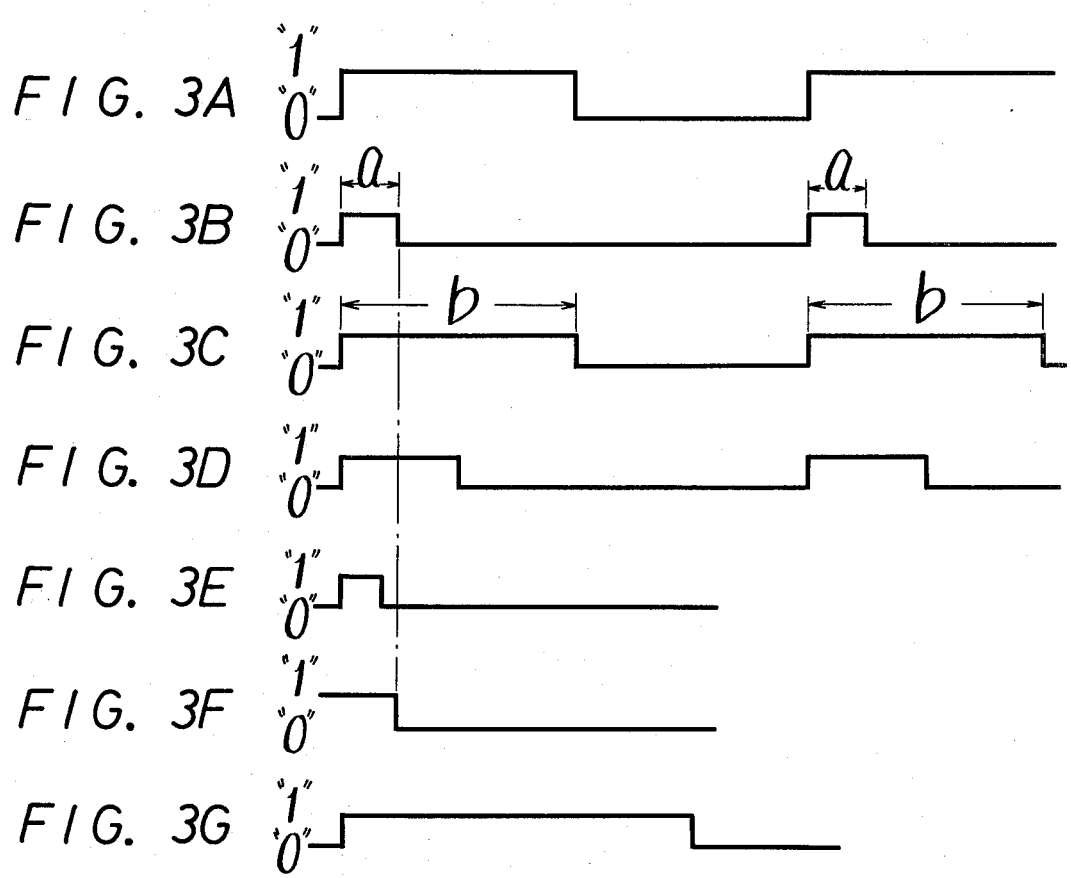
FIGS. 3A to 3G are waveform diagrams used for explaining the operation of the example of the invention shown in FIG. 2.

In FIG. 2, references 20a and 20b designate first and second reference pulse oscillators, respectively. The first reference pulse from the first reference oscillator 20a shown in FIG. 3B is so selected that its pulse width a is somewhat wider than the value where when the load becomes small the pulse width of the switching pulse from the pulse width modulator 12A becomes minimum as the transistor 7 is used. The second reference pulse from the second reference oscillator 20b is so selected that, as shown in FIG. 3C, its pulse width b satisfies the following condition:

$$D_b = \frac{L1 + L2}{L1} \times D_a$$

where Da represents the duty ratio of the first reference pulse and $D_b$ represents the duty ratio of the second reference pulse, respectively.

In this case, the first and second reference pulses are synchronized with the clock pulse, which is shown in FIG. 3A, from the clock pulse oscillator 13.

The first reference pulse from the first reference pulse oscillator 20a is fed to one of the input terminals of a NAND-circuit 21, which is supplied at the other input terminal thereof with the signal "0" or "1" appearing at the Q-output terminal of flip-flop circuit 17. The second reference pulse from the second reference pulse oscillator 20b is fed to one of to one of the input terminals of a NAND-circuit 22 which is supplied at its other input terminal with the signal appearing at the Q-output terminal of flip-flop circuit 17 through an inverter 23. The output signals from the NAND-circuits 21 and 22 are fed to both input terminals of a NAND-circuit 24, respectively. In this case, NAND-circuits 21, 22, 24 and the inverter 23 form a reference pulse selecting circuit. When the output signal at the Q-output terminal of flip-flop circuit 17 is "1", the first reference pulse is obtained at the output side of NAND-circuit 24, while when the output signal at the Q-output terminal is "0", the second reference pulse is obtained at the output side of NAND-circuit 24, respectively. The first or second reference pulse obtained at the output side of NAND-circuit 24 is applied to one of the input terminals of a comparator 25. The switching signal from the pulse width modulator 12A is applied to one of the input terminals of an exclusive OR-circuit 26 which is applied at its other input terminal with the signal "1" or "0" obtained at the Q-output terminal of flip-flop circuit 17, and the output signal from exclusive OR-circuit 26 is fed to the other input terminal of comparator 25. Thus, this comparator 25 produces the output signal "1" when the output signal of exclusive OR-circuit 26 is a high level signal "1" upon the falling down of the reference pulse. The output signal of comparator 25 is fed to flip-flop circuit 17 at its D-terminal. As will be described later, the pulse width modulator 12A is so formed that it changes over the inclination or slope of the sawtooth waveform signal, which is used to provide the switching signal, in response to the output signal from flip-flop circuit 17 at the same time as the transistors 6 and 7 are changed over. The other circuit construction of the switching regulator according to the present invention is substantially the same as that of the prior art switching regulator shown in FIG. 1.

According to the switching regulator of the present invention constructed as above described, if it is assumed that, as shown in FIG. 3D, the pulse width of the switching signal from the pulse width modulator 12A is wider than that a of the first reference pulse but narrower than that b of the second reference pulse, the Q-output terminal of flip-flop circuit 17 becomes "1". Thus, the switching signal is applied through the AND-circuit 19 to the base of transistor 7 to switch it in accordance with a DC output voltage developed at the output terminal 9 so as to make the DC output voltage constant. At this time, the first reference pulse is delivered to the output side of NAND-circuit 24. As the load connected to the output terminal 9 becomes small from the above state and the pulse width of the switching signal from the pulse width modulator 12A becomes narrower than that a of the first reference pulse, as shown in FIG. 3E, the output signal from exclusive OR-circuit 26 becomes "0" at the falling-down of the first reference pulse as shown in FIG. 3F. Thus, the flip-flop circuit 17 is inverted in synchronism with the clock pulse and hence its Q-output terminal is made "0" and its $\overline{Q}$-output terminal is made "1", respectively. Accordingly, the second reference pulse is delivered to the output side of NAND-circuit 24. Hence, the switching signal from the pulse width modulator 12A is fed through AND-circuit 18 to the base of transistor 6 to switch the same. In this case, the pulse width of the switching signal from pusle width modulator 12A is modulated in response to the DC output voltage obtained at the output terminal 9, so that the DC output voltage appearing at the output terminal 9 can be made constant.

Next, as the load at the output terminal 9 becomes great, the DC output voltage becomes very small. Thus, the pulse width of the output pulse from the pulse width modulator 12A becomes wide. When the pulse width of the switching signal becomes wider than that b of the second reference pulse, as shown in FIG. 3G, at the falling-down of the second reference pulse, the output signal from the exclusive OR-circuit 26 becomes "1" (in this case, since the Q-output terminal of flip-flop circuit 17 is "0", the switching signal is delivered as it is to the output side of exclusive OR-circuit 26). Therefore, the output side of comparator 25 becomes "1", and flip-flop circuit 17 is inversed in synchronism with the clock pulse. Accordingly, the switching signal with the above pulse width is fed to the base of transistor 7 through the AND-circuit 19. However, if this is done, the transistor 7 is saturated and the DC output voltage is somewhat overshot to cause an oscillation. To avoid this defect, in the present invention, the slope of the sawtooth waveform signal, which is used to provide the switching signal, is varied in the pulse width modulator 12A in response to the output from, for example, the $\overline{Q}$-output terminal of flip-flop circuit 17 upon the switching from transistor 6 to transistor 7 to change the wide pulse width of the switching signal shown in FIG. 3G to such a value at which the transistor 7 will operate with a predetermined operation range, for example, the pulse width between the first and second reference pulses. The switching signal thus corrected is fed through AND-circuit 19 to the base of transistor 7 so that the transistor 7 operates normally without being saturated, and accordingly, the changing between transistors 6 and 7 can be carried out smoothly.

Figure 4:
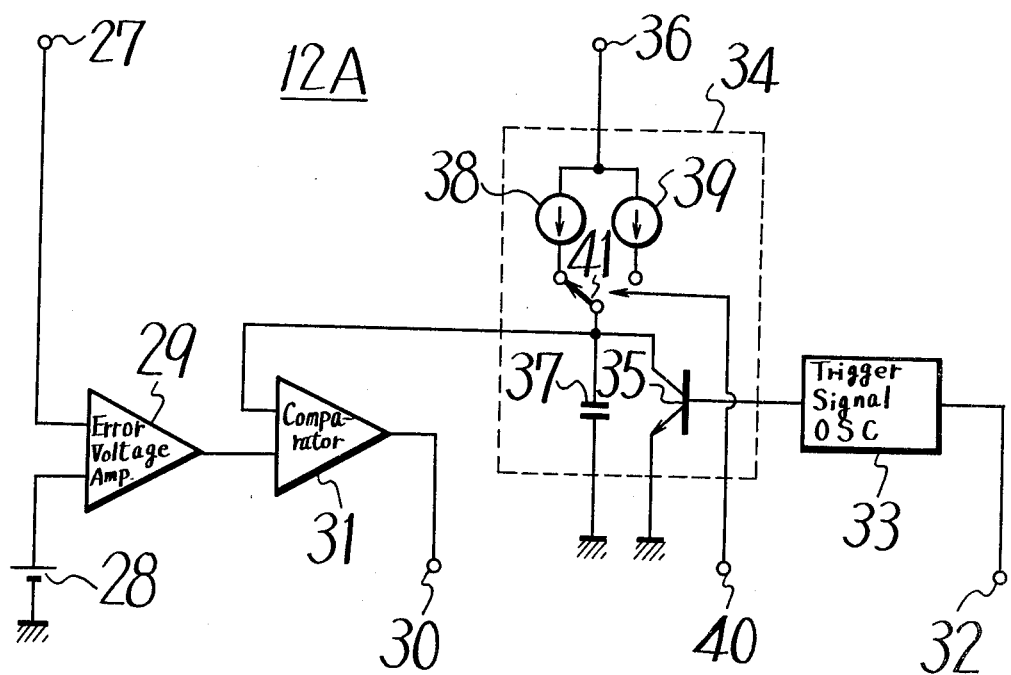
FIG. 4 is a circuit diagram showing an example of the pulse width modulator which is used in the example of the invention shown in FIG. 2.

FIG. 4 is a circuit diagram showing an example of the pulse width modulator 12A used in the example of the invention shown in FIG. 2. One input terminal of the pulse width modulator 12A shown in FIG. 4, is connected to a terminal 27 which receives the detected output through the coupler 11 (refer to FIG. 2). The pulse width modulator 12A includes an error voltage amplifier 29, which is connected at one of its input terminals to the terminal 27 and at its other input terminal is connected to a reference voltage source 28, an amplitude comparator 31, which is supplied at its one input terminal with the output from the error voltage amplifier 29 and at its other input terminal with a sawtooth waveform signal to compare both signals and to supply a predetermined switching signal through a terminal 20 to AND-circuits 18, 19 and exclusive OR-circuit 26 (refer to FIG. 2), a trigger signal oscillator 33, which is formed of a ring-counter or the like, supplied with the clock pulse from the clock pulse oscillator 13 (refer to FIG. 2) through a terminal 32 and produces a trigger signal at every predetermined period, and a sawtooth waveform signal generator 34 which produces the sawtooth waveform signal in synchronism with the trigger signal from the trigger signal oscillator 33. In this case, as the error voltage amplifier 29, amplitude comparator 31 and trigger signal oscillator 33, well-known ones are used. The sawtooth waveform signal generator 34 includes a transistor 35 and a capacitor 37. In this case, the transistor 35 is made ON and OFF in response to the trigger signal from the trigger signal oscillator 33 and then the capacitor 37, which is supplied with a current from a power supply terminal 36, is charged and discharged through transistor 35 similar to the known technique. In the example of the invention shown in FIG. 4, between the power supply terminal 36 and one electrode of capacitor 37, there are provided current sources 38 and 39 for the sawtooth wave, which can be switchable as to each other, and a switch 41 which switches the current sources 38 and 39 in response to the signal from a terminal 40 connected to, for example, the $\overline{Q}$-output terminal of flip-flop circuit 17 (refer to FIG. 2).

The operation of the pulse width modulator 12A shown in FIG. 4 will be described with reference to FIGS. 5A to 5D.

Figure 5A:
FIGS. 5A to 5D are waveform diagrams used for explaining the operation of the pulse width modulator shown in FIG. 4.
Figure 5B:
Figure 5C:
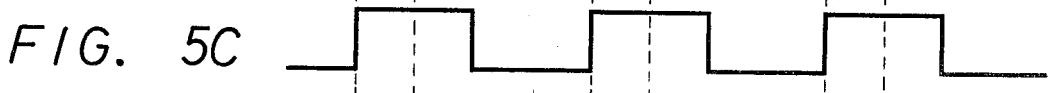

The detected output at the output terminal 9 (refer to FIG. 2) through the terminal 27 is compared with the reference voltage from the reference voltage source 28 by the error voltage amplifier 29, and the difference signal therebetween delivered from the amplifier 29 is fed to one input terminal of comparator 31 as a reference level L shown in FIG. 5B. It is assumed that, for example, the $\overline{Q}$-output terminal of flip-flop circuit 17 is in the level "1", and the switch 41 is switched to, for example, the current source 38 of large current capacity in response to the signal at the $\overline{Q}$-output terminal fed thereto through the terminal 40. Under such assumption, the capacitor 37 is charged by the current source 38 and then discharged through the transistor 35 which is made ON in response to the trigger signal from the trigger signal oscillator 33 shown in FIG. 5A. When the capacitor 37 is repeatedly charged and discharged in response to the trigger signal, the sawtooth waveform signal generator 34 produces a sawtooth waveform signal shown in FIG. 5B by the solid line which is applied to the other input terminal of amplitude comparator 31. Thus, comparator 31 produces a switching signal having, for example, 50% of the pulse width shown in FIG. 5C from the sawtooth waveform signal and reference level L. This switching signal is fed through terminal 30 and AND-circuit 18 to the base of transistor 6 (refer to FIG. 2).

Figure 5D:

If the above switching signal with 50% pulse width is applied to the transistor 7 upon the changing from transistor 6 to 7, this transistor 7 is operated by the switching signal of the above pulse width. As a result, the output DC voltage overshoots a little. To avoid this, since the level at the $\overline{Q}$-output terminal of flip-flop circuit 17 is changed from "1" to "0" at the time when the transistor 6 is switched to transistor 7, the switch 41 is also switched in response to this level change from current source 38 to current source 39 of small current capacity so as to produce a sawtooth waveform signal of small inclination or slope. Accordingly, the sawtooth waveform signal generator 34 produces a sawtooth waveform signal shown in FIG. 5B by the broken line which is then fed to the amplitude comparator 31. Thus, this comparator 31 produces a switching signal with a narrow pulse width as shown in FIG. 5D. Accordingly, the transistor 7 is operated by this switching signal shown in FIG. 5D, so that the output DC voltage is not overshot and also the oscillation phenomenon that the pulse width of the switching signal is narrowed rapidly and the transistor 7 is switched to the transistor 6 again is removed.

As will be apparent from the above description, according to the switching regulator of the present invention, when the load connected to the output terminal 9 is small, the transistor 6 is switched and whole the primary winding 4a (L1+L2) of transformer 4 is used, while when the load at the output terminal 9 is large, the portion of primary winding 4a from its one end to its mid tap (L1) is used. The output DC voltage which is sufficiently stable regardless of load variation can be obtained.

Further, in this invention, there is no need to provide a current detecting circuit at the secondary side of transformer 4, so that the circuit construction becomes simple and hence inexpensive.

Also, since similar to the switching of the switching elements the inclination of slope of the sawtooth waveform signal, which is used to provide the switching signal, is changed to change the pulse width of the switching signal, so that there is no need that the switching signal be varied with a wide pulse width, the output DC voltage is overshot and the oscillation phenomenon is generated. Thus, the switching elements can be switched smoothly.

In the example of the invention, two switching elements are used, but it will be, of course, no need that the present invention be limited to the example. When more than two switching elements are used, the same effect can be achieved also.

Further, in the example of the invention, the switch 41 in the sawtooth waveform signal generator 34 is switched in response to the output from the $\overline{Q}$-output terminal of flip-flop circuit 17, but can be switched in response to the output from the Q-output terminal of flip-flop circuit 17 with the same effects.

Also, in the present invention, the slope of the sawtooth waveform signal is changed by switching different current sources 38 and 39, but this can be changed be switching plural capacitors of different capacities provided in place of the single capacitor 37 with the same effects.

The above description is given on the single preferred embodiment of the invention, but it will be apparent that many modifications and variations could be effected by those skilled in the art without departing from the spirit or scope of the novel concepts of the present invention. Therefore, the spirit or scope of the invention should be determined by the appended claims only.

We claim as our invention

1. In a switching regulator including a DC voltage source having first and second DC output terminals, a switching transformer having a magnetic core, first and second primary windings and a secondary winding, a first switching transistor connected in series between said first and second DC output terminals through said first primary winding, a second switching transistor connected in series between said first and second DC output terminals through said first and second primary windings, rectifying means connected across said secondary winding, a load connected to said rectifying means, a clock pulse oscillator having two outputs, a pulse width modulator supplied with both outputs of said clock pulse oscillator and said rectifying means so as to produce a PWM control signal the duty of which is proportional to the voltage of said rectifying means; and switching means for selectively supplying said PWM control signal to one of said first and second switching transistors in response to the circumstances of said load; said switching regulator further comprising control means for narrowing the duty of said PWM control signal when said switching means is operated to supply said PWM control signal from one of said first and second switching transistors to the other so as to eliminate an excessive drive to the other of said switching transistors.

2. A switching regulator according to claim 1, in which said pulse width modulator comprises an amplitude comparator having first and second input terminals and at an output terminal of which said PWM control signal is derived, circuit means for coupling one part of the output signal of said rectifying means to the first input terminal of said amplitude comparator, a sawtooth wave generator, and circuit means for coupling the output of said sawtooth wave generator to the second input terminal of said amplitude comparator, and in which said control means controls the slope of the output signal of said sawtooth wave generator in response to the switching operation of said switching means.

3. A switching regulator according to claim 2, in which said sawtooth wave generator comprises capacitor means connected between the second input terminal of said amplitude comparator and a reference point, a further switching transistor having base, emitter and collector, the collector and emitter of which are connected across said capacitor means and the base of which is supplied with the output of said clock pulse oscillator to ON/OFF control the same, first and second current sources each having a different current value to the other, and further switching means selectively supplying one output of said first and second current sources to said capacitor means so as to vary the slope of the output of said sawtooth wave generator in cooperation with said switching means.

4. A switching regulator according to claim 3, which further comprises a trigger signal oscillator having an input connected to said clock pulse oscillator and an output connected to the base of said further switching transistor so as to ON/OFF-control the same.

5. A switching regulator according to claim 4, which further comprises an error voltage amplifier having a pair of inputs connected to the output of said rectifying means and a reference DC voltage source and an output connected to the first input terminal of said amplitude comparator.

6. A switching regulator according to claim 1, in which said switching means comprises reference pulse signal generating means for producing at least a reference pulse signal having a standard pulse width, comparing means for comparing the pulse width of said PWM control signal with that of said reference pulse signal and producing a switching signal indicative of the circumstances of said load in response to the comparison result therebetween, and gate circuit means supplied with the PWM control signal from said pulse width modulator and the switching signal from said comparing means so as to supply the PWM control signal to one of said first and second switching transistors in response to said switching signal.

7. A switching regulator according to claim 6, which further includes memory means for memorizing said switching signal from said comprising means so as to continuously supply said switching signal to one of said first and second switching transistors during the same circumstance of said load.

8. A switching regulator according to claim 7, in which said memory means comprises a D-type flip-flop.

9. A switching regulator according to claim 8, in which said D-type flip-flop has a T-terminal connected to the output of said clock pulse oscillator, a D-terminal connected to the output of said comparing means and a pair of Q and $\overline{Q}$ output terminals connected to said gate circuit means, respectively.

10. A switching regulator according to claim 9, which further includes circuit means coupled to said further switching means and the $\overline{Q}$ output of said D-type flip-flop so as to cooperate said further switching means with said first recited switching means.

* * * * *